(12) United States Patent
Diamond

(10) Patent No.: US 6,325,580 B1
(45) Date of Patent: Dec. 4, 2001

(54) DEVICE FOR MOUNTING TO HOLLOW STRUCTURES

(76) Inventor: David Diamond, 20 Riverwood Dr., Dublin (IE)

(*) Notice: Subject to any disclaimer, the term of this patent is extended or adjusted under 35 U.S.C. 154(b) by 0 days.

(21) Appl. No.: 09/601,158

(22) PCT Filed: Jan. 29, 1999

(86) PCT No.: PCT/IE99/00008

§ 371 Date: Jul. 28, 2000

§ 102(e) Date: Jul. 28, 2000

(87) PCT Pub. No.: WO99/39108

PCT Pub. Date: Aug. 5, 1999

(30) Foreign Application Priority Data

Jan. 30, 1998 (IE) .................................................. S980061

(51) Int. Cl.[7] .............................. F16B 13/04; F16B 13/06
(52) U.S. Cl. ................................ 411/40; 411/53; 411/183
(58) Field of Search .................................. 411/40, 42, 52, 411/53, 55, 183, 339

(56) References Cited

U.S. PATENT DOCUMENTS

| | | | |
|---|---|---|---|
| 979,853 | * | 12/1910 | Hartshorn ................................ 411/53 |
| 2,343,283 | * | 3/1944 | Davis ..................................... 411/53 |
| 3,216,304 | * | 11/1965 | James et al. ............................ 411/40 |
| 3,465,637 | * | 9/1969 | Cushman et al. ....................... 411/40 |
| 3,797,358 | | 3/1974 | Allender . |

FOREIGN PATENT DOCUMENTS

| | | |
|---|---|---|
| 1.522.481 | 8/1968 | (FR) . |
| 845205 | 8/1960 | (GB) . |
| 1164371 | 9/1969 | (GB) . |

* cited by examiner

*Primary Examiner*—Neill Wilson
(74) *Attorney, Agent, or Firm*—Daly, Crowley & Mofford, LLP

(57) ABSTRACT

A mounting device includes a first component and a second component. The first component has a forwardly disposed nose, a rearwardly disposed and outwardly flared cutting member, and a bore extending through the nose and cutting member and which is threaded at least along part of its length. The second component comprises a tube for fitting over the nose of the first component. In use, when the tube is fitted over the nose 15 and forced in an axial direction against the cutting member the latter progressively splits the tube substantially parallel to its axis into a plurality of "petals" which become mutually splayed out radially with respect to the axis of the bore.

18 Claims, 5 Drawing Sheets

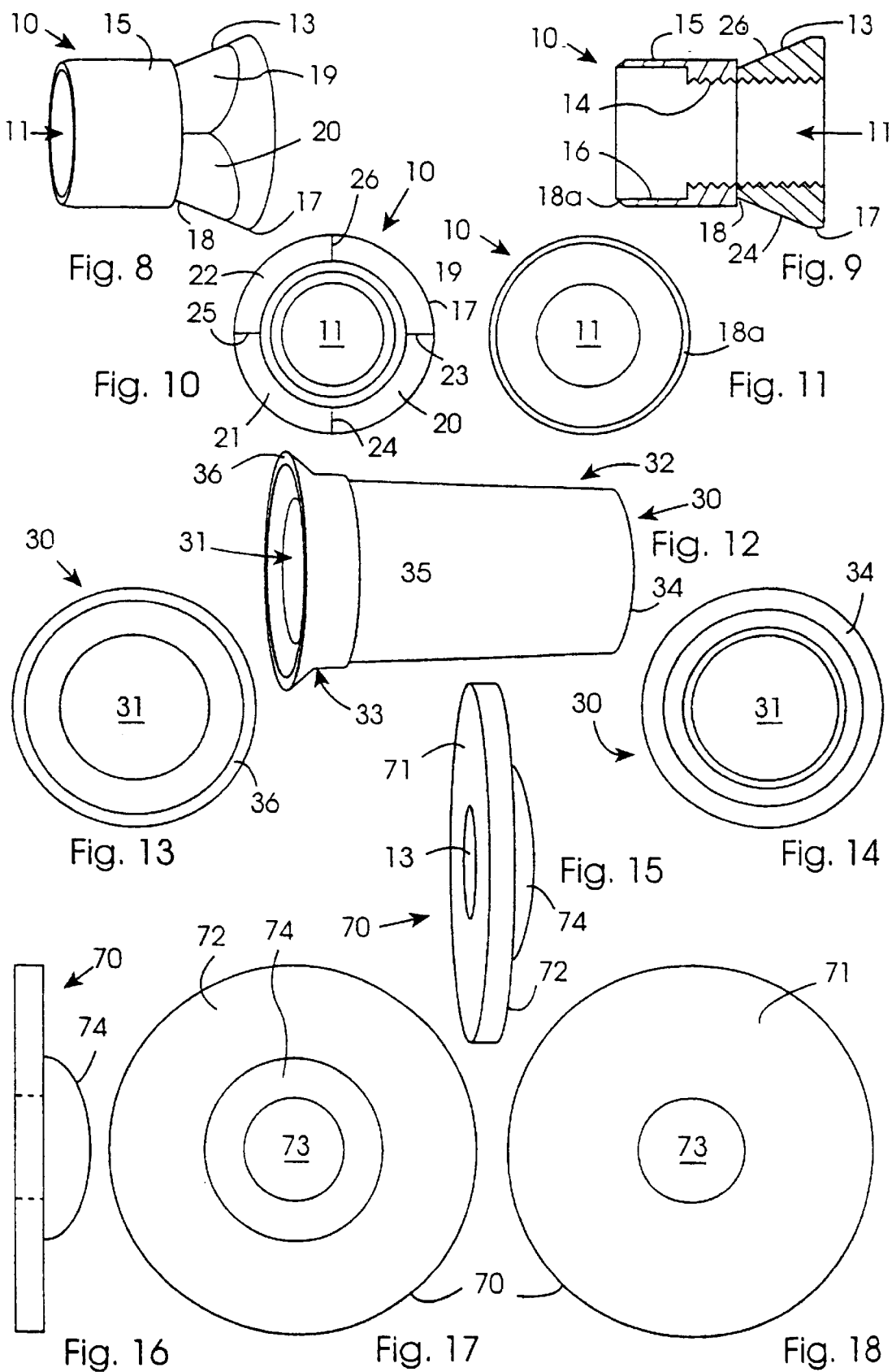

DEVICE FOR MOUNTING TO HOLLOW STRUCTURES

Related Application Device for mounting to hollow structures Government rights

FIELD OF THE INVENTION

The invention related generally to a mounting device and more particularly a device for mounting to hollow structure.

More particularly, the invention relates to a mounting or anchoring device for enabling the hanging of curtains and/or blinds directly to a hollow window or door frame.

BACKGROUND OF THE INVENTION

Window blinds and net-curtains are invariably hung inside the window reveal and, where possible and convenient, are hung from brackets or fittings which are attached directly to the window frame.

In order to support window-blinds or net-curtains on window-frames or on door-frames, it is necessary in the first instance to attach a support bracket or other fitting to the frame. Where the window or door frame is made of solid timber the support bracket or fitting can be supported by passing a screw through the bracket or fitting and then driving the screw into the timber frame.

However window and door-frames are, generally, not constructed from solid timber or from any other solid material but are made from materials such as $\mu$PVC, aluminium or composite materials not in solid form but in hollow multi-cavity form having a relatively thin outer wall and several separate longitudinal cavities inside.

FIG. 7 is a cross-sectional view of a known hollow multi-cavity $\mu$PVC window frame.

The support bracket or other fitting required to support window-blinds or net-curtains on hollow frames cannot be successfully attached to the frame by means of a screw for the following reasons:

(a) the outer wall of the $\mu$PVC window or door frame is usually not more than about 3 mm thick;

(b) the outer wall of an aluminium window or door frame is usually not more than about 1.5 mm thick.

These wall thicknesses are insufficient to give a screw the long term grip required to hold support brackets for window blinds or fittings for net-curtains. Furthermore, the main internal cavity in the frame is sealed against moisture and must not be breached by a screw which is driven into the frame and, thus, the screw can only penetrate the outer wall of the frame and must not penetrate beyond the first cavity of the frame.

Where screws are used by a window manufacturer to apply attachments a $\mu$PVC frame, then the $\mu$PVC must be of double thickness at the point where the screw enters the frame. Manufacturers of window-frame material do not generally provide double wall thickness where support brackets or fitting might be expected to be attached for the support of window-blinds or net-curtains.

Consequently, screws should not be, and generally are not, used to attach brackets or fittings to $\mu$PVC or to aluminium window or door frames.

While inappropriate improvised methods and materials are sometimes used by DIY enthusiasts, professional fitters of window-blinds and net-curtains do not attach support brackets or fittings directly to hollow frames by means of screws.

As an alternative to driving a screw directly into a relatively thin or relatively weak sheet material, various 'cavity-fixings' are available for general purposes. These general purpose cavity fixings provide a variety of ways of attaching a solid or threaded medium to the thin or weak sheet which medium is then capable of receiving and retaining a screw.

General purpose cavity fixings are successful in many thin or weak sheet applications. However because of the special constraints associated with hollow frames, general purpose cavity fixings cannot be used successfully to support window-blind brackets or fittings for net-curtains on such frames.

To be suitable for use in typical hollow frames a cavity mounting device should preferably have the following characteristics:

(a) in view of the fact that the outer wall of the frame is relatively thin and relatively weak, the fitting must be capable of providing a wide load-bearing surface to the rear of the face material. Preferably, the load-bearing surface must be wider than the typical first cavity in a hollow frame is deep;

(b) in view of the relatively shallow nature of the first cavity in the frame and the unacceptability of breaching the second cavity, the fitting must be capable of operating in a cavity no greater than about 5 mm deep i.e. it should not be necessary for the fitting to protrude more than 5 mm behind the front wall of the frame;

(c) the fitting must not require to be placed fully home in the hole in the host material before being deformed. Preferably, it should be capable of being deformed progressively as the fitting is fed into the hole;

(d) the fitting should be capable of being used in a cavity which is not as deep as the fitting is long;

(e) the fitting should be incapable of becoming wedged partly in and partly out of the hole in the host material;

(f) the fitting should be capable of being placed as close as 7 mm from the side wall of the window reveal;

(g) the fitting should adjust automatically to unpredictable obstructions inside the first cavity of the frame e.g. side walls of upper or lower cavities;

(h) the fitting should be capable of withstanding relatively heavy loads which tend to withdraw the fitting from the frame and must do so without damaging or marking the frame;

(i) the fitting should be capable of being applied with a tool which is easy to use and which can be relatively inexpensive to manufacture;

(j) the fitting should be capable of re-use i.e. the screw attaching the bracket or other fitting to the fixing should be capable of being removed and reliably replaced in the event of the bracket being removed;

(k) the fitting should lock in relation to the outer wall so as not to fall into the cavity in the event of a screw being placed in the fixing with excessive inward force;

(l) the fitting should provide a virtually flush fit with the outer surface of the outer wall of the frame; and (m) the fitting should be capable of application by relatively unskilled operatives.

FIG. 1 shows an example of a known fitting which comprises a hollow tapered body 500 with side splits, a plurality of sharp projections on the exterior and screw threads on the interior.

After the known fitting 500 of FIG. 1 is placed in the hole in the material 501, a screw 502 is threaded into the fitting causing the fitting to expand outwards thus causing the sharp projections to penetrate into the side of the hole in the host material.

The fitting of FIG. 1 is not suitable for use in the outer wall of hollow frames as the projections grip with short teeth and only into the range of the wall thickness of the outer wall which is no more than 3 mm. It does have a function for use with very light loads.

FIG. 2 shows an example of a known fitting which comprises a hollow tapered body 600 with side splits and having internal and external threads, the external threads being of a greater height at the broad end of the fitting. After the fitting of FIG. 2 is screwed into the hole of the material 501, a screw 502 is threaded into the fitting causing the fitting to expand and the external threads to lock deeper into the host material 501. The fitting of FIG. 2 is not suitable for use in the outer wall of hollow frames as it is not capable of carrying the required load without pulling out of the host material. The grip range is limited to the thickness of the outer wall which is not more than about 3 mm. It does have a function for use with very light loads.

FIGS. 3 and 4 show an example of a known fitting which comprises a hollow body 700 the interior lower part of which is threaded. A screw 502 or pulling mandrel is fitted into the internal threads thereof and is used to compress the fitting which, as a result, bulges out behind the face material 501. The bulge 701 resists withdrawal of the fitting. This fitting is normally used in sheet metal but is not suitable for use in weaker material through which it will pull under load as it does not have a wide load-bearing area behind the face material.

FIGS. 5 and 6 shows a known fitting 800 which comprises a head 801 and a threaded end portion which are joined by a plurality of collapsible arms.

A screw 502 or pulling mandrel is fitting into the internal threads and is used to compress the fitting as a result of which collapsible arms 802 collapse outwards behind the face material.

The fitting of FIGS. 5 and 6 provide a wide load-bearing area to the rear of the face material but is not suitable for use in hollow frames as it:

requires a deeper cavity than is available;

does not provide a sufficiently flush finish on the surface of the face material;

does not adjust to internal obstructions;

requires to be placed fully home in the hole before it is compressed otherwise it is liable to become wedged partly in and partly out of the hole.

Other known cavity anchors are available but they either exhibit at least one of the flaws mentioned in relation to the examples at FIGS. 1 to 6 above and/or none enjoys characteristics which would render it suitable as a cavity anchor for use in hollow frames.

Other techniques which have been tried and found to be less than successful include self-adhesive pads (they tend to fall off) and telescopic tension-rods from which curtains on non-curved windows may be hung. However, this arrangement is not suitable for blinds.

To overcome the problems associated with the above identified known fittings, window-blind fitters and householders are compelled to drill into the plasterwork above or to the side of the window frame in order to attach a fitting with a rawl type plug and a wood-screw. This results in serious disadvantages:

(a) it involves a degree of skill and equipment which makes it necessary for many householders to engage a professional fitter and thus expense;

(b) the process is generally slow, labour-intensive and therefore expensive;

(c) the process interferes with decoration and causes a cascade of plaster and concrete dust in the room;

(d) the fitter does not know until he drills the hole whether his attempt will in fact find solid ground to support the rawl-plug and screw; frequently he encounters dry-lining with brittle unsupporting plaster and a hollow cavity, a steel girder or a pre-cast lintel. The fitter is then obliged to abandon the first attempt and endeavour to make good the decoration and try again, hopefully this time to succeed but perhaps not;

(e) the problems are compounded where more than one hole must be drilled at an exact distance from another hole. This arises where brackets for window blinds are being fitted in which there are usually at least two holes required. If the second hole in the plaster is unsuccessful then both it and the first hole must be abandoned, the decoration made good and a new site tried;

(f) fitters, whether amateur or professional, prefer to attach fittings with the minimum of trouble and the maximum of security. They would prefer not to drill and screw but if they have to drill and screw they prefer a predictable medium like timber.

Unfortunately, the most popular window frames today (aluminium and μPVC frames) do not provide such a medium. The medium cannot support a screw and cannot easily be repaired or filled.

It is an object of the present invention to overcome or mitigate these problems.

Accordingly, there is provided a mounting device as claimed in claim 1.

SUMMARY OF THE INVENTION

A mounting device including a first component having a forwardly disposed nose, a rearwardly disposed and outwardly flared cutting member, and a bore extending through the nose and cutting member and which is threaded at least along part of its length, and a second component, which is of a relatively softer material than the first component, and having walls which define a tube for fitting over the nose of the first component. When the tube is fitted over the nose and forced in an axial direction against the cutting member the latter progressively splits the tube substantially parallel to its axis into a plurality of elements and splays such elements mutually radially outwardly with respect to the axis of the bore and the cutting member further causes the elements to curve back upon themselves.

BRIEF DESCRIPTION OF THE DRAWINGS

The invention will be understood in greater detail from the following description of a preferred embodiment thereof given by way of example only and with reference to the accompanying drawings in which:

FIG. 8 is a perspective view of the first component of a mounting device according to an embodiment of the invention;

FIG. 9 is a cross-sectional view of the component of FIG. 8 of the drawings;

FIG. 10 is a left hand view side elevation of the component of FIG. 8 of the drawings;

FIG. 11 is a right hand view side elevation of the component of FIG. 8 of the drawings;

FIG. 12 is a perspective view of a second component of the mounting device according to the embodiment of the invention;

FIG. 13 is a left hand view side elevation of the component of FIG. 12 of the drawings;

FIG. 14 is a right hand view side elevation of the component of FIG. 12 of the drawings;

FIG. 15 is a perspective view of a device for use in the placement of the device according to the embodiment of the invention;

FIG. 16 is a side elevation of the device of FIG. 15 of the drawings;

FIG. 17 is a right hand view side elevation of the device of FIG. 16 of the drawings;

FIG. 18 is a left hand view side elevation of the device of FIG. 16 of the drawings;

DETAILED DESCRIPTION

Figure 1:
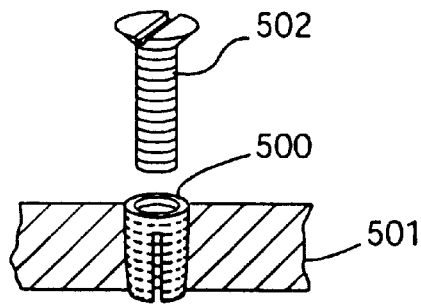
FIG. 1 is a side elevation of a first known fitting.
Figure 2:
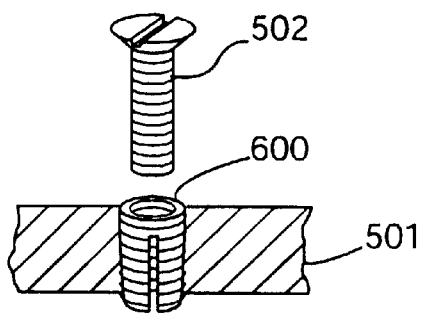
FIG. 2 is a side elevation of a second known fitting.
Figure 3:
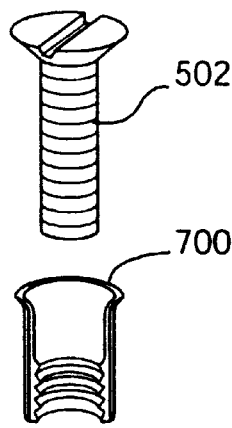
FIG. 3 is a side elevation of a third known fitting.
Figure 4:
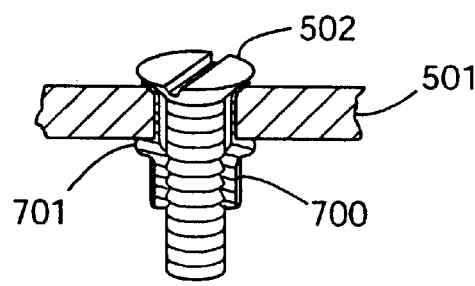
FIG. 4 is a side elevation of the fitting of FIG. 3 of the drawings shown in situ.
Figure 5:
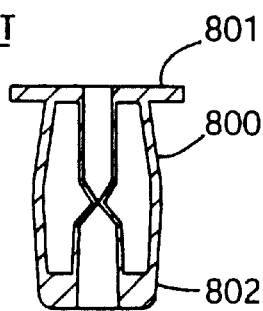
FIG. 5 is a side elevation of a fourth known fitting.
Figure 6:
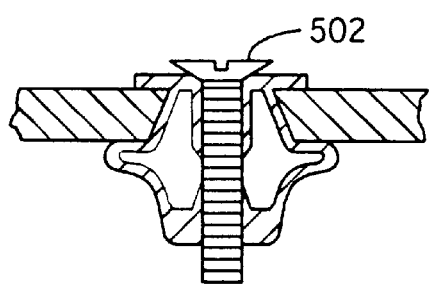
FIG. 6 is a side elevation of the fitting of FIG. 5 shown in situ.
Figure 7:
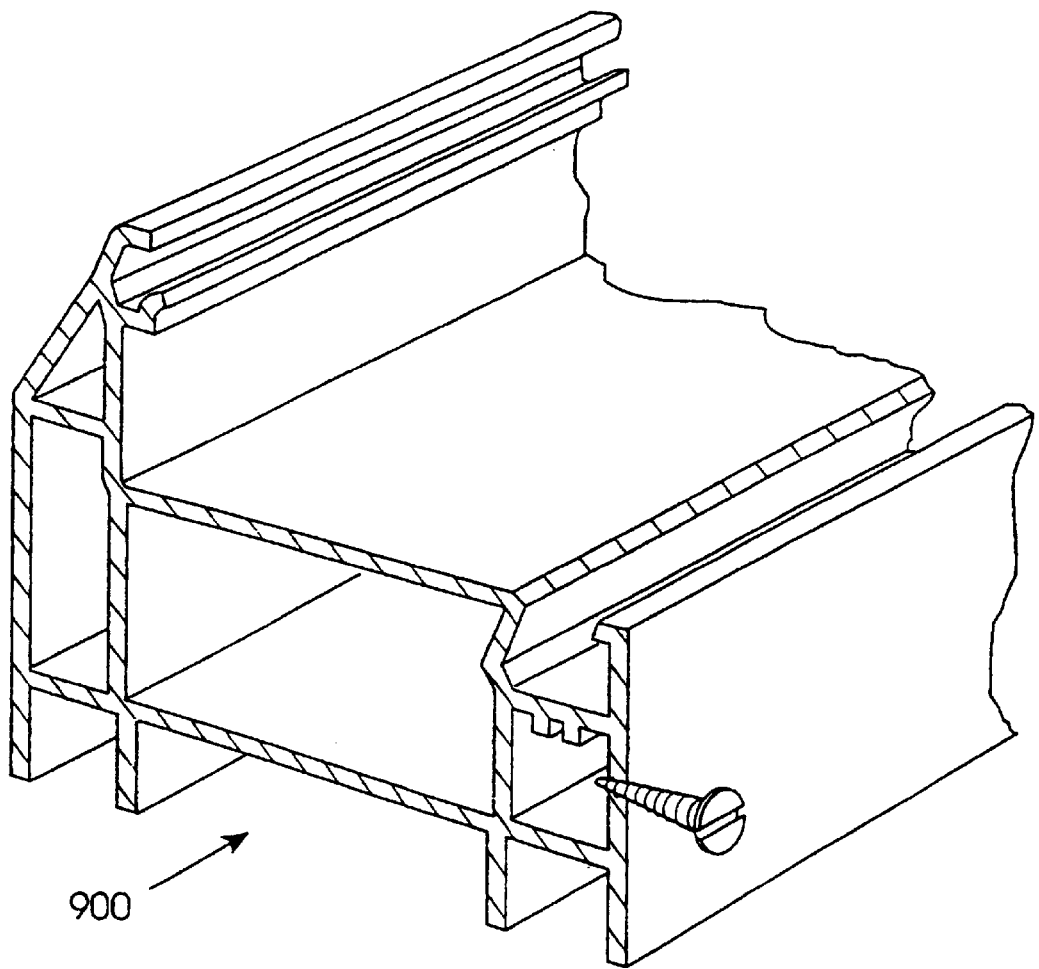
FIG. 7 is a perspective cutaway view of a window frame.

Referring now to the drawings, FIGS. 1–6 which show known fitting devices and FIG. 7 which shows a known window frame have been described earlier in the specification.

Referring now to FIGS. 8–26 of the drawings and initially to FIGS. 8–11 of the drawings, there is shown a first component 10 of a mounting device 100 according to the embodiment of the invention. The component 10, which is made of a relatively hard material such as a metal and has a through bore 11, comprises a forwardly disposed nose 15 having a front edge 18a in the form of a truncated cone and a rearwardly disposed cutting member in the form of a nut 13, the bore 11 extending substantially coaxially through the nut 13 and nose 15. Within the rearwardly disposed nut 13 the bore 11 has an internal screw thread 14 which extends some distance into the forwardly disposed nose 15. Forwardly of the internally disposed screw thread 14, the diameter of the bore 11 of the first component 10 is slightly larger than the diameter of the bore 11 having the thread 14. Thus, the wall 16 of the nose 15 forwardly of the thread 14 is substantially thinner than the wall having the threads 14 thereon.

The external diameter of the nut 13 at its most rearwardly disposed part 17 is substantially greater than the external diameter of the forwardly disposed part 18 of the nut 13 which latter diameter is also the diameter of the unthreaded part of the bore 11 at the front of the nose 15. Thus, the external surface of the nut 13 flares outwardly in a rearward direction and has four rearwardly and outwardly inclined facets 19, 20, 21 and 22. These facets 19–22 are separated from each other by respective arrises. Thus, the facets 19, 20 are separated by an arris 23; the facets 20, 21 by an arris 24; the facets 21, 22 by an arris 25; and the facets 22, 19 by an arris 26. Each of these arrises 23–26 provides a respective cutting edge.

With reference now to FIGS. 12–14, there is shown a second component 30 of the device 100. The second component 30 is composed of a softer material, which may also be a metal, when compared with the material of the first component 10.

The second component 30 has a through bore 31 and comprises a rearwardly disposed tube 32 and a forwardly disposed collar 33. The tube 32 has a free end 34 the internal diameter of which is greater than the external diameter of the nose 15 of the first component 11. The tube 32 flares slightly outwardly in the direction of the collar 33 so that the diameter of the tube 32 where it meets at 35 with the collar 33 is slightly larger in diameter than at the end 34. The collar 33 at the rearwardly disposed end 35 is larger in diameter than the forwardly disposed part of the tube 32 at 35. For a short distance, the collar 33 is of substantially constant external diameter but then flares outwardly so that the forwardly disposed end 36 of the collar 33 has a diameter substantially greater than that at the end 35.

The through bore 31 is of substantially constant internal constant cross section throughout its length except at the forwardly disposed end 36 where the diameter is somewhat greater.

Figure 21:
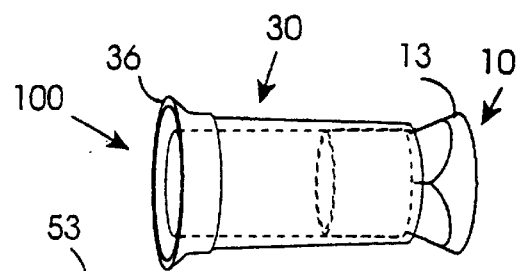
FIG. 21 shows the mounting device according to the embodiment of the invention being offered to the tool of FIG. 20 of the drawings.
Figure 22:
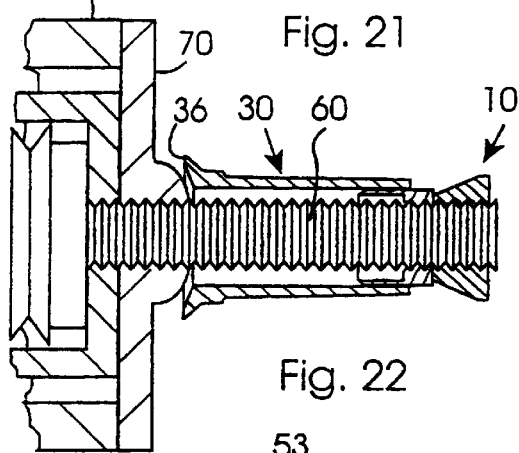
FIG. 22 shows the tool of FIG. 20 of the drawings and the mounting device according to the embodiment of the invention in interengagement.

The mounting device 100 according to the embodiment of the invention is made by the interengagement of the first component 10 with the second component 30 as shown in FIG. 21 of the drawings. As will be observed from FIG. 21, the tube 32 of the second component 30 is fitted over the nose 15 of the first component 10 and is an interference fit therewith so that the end 34 of the tube 32 abuts the rearwardly flared external surface of the nut 13.

Figure 19:
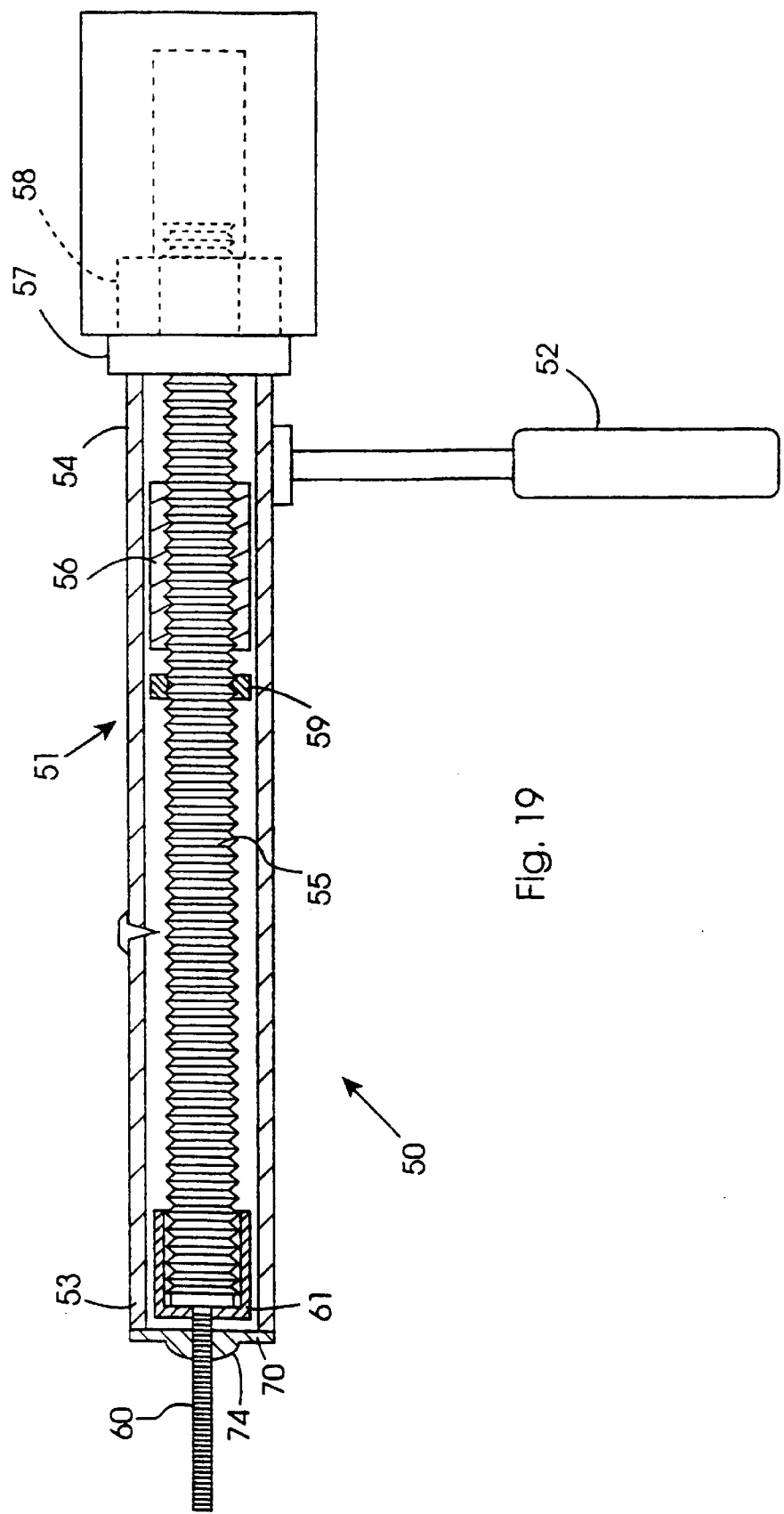
FIG. 19 is a cutaway view of a tool for, use in the placement of the mounting device according to the embodiment of the invention.
Figure 20:
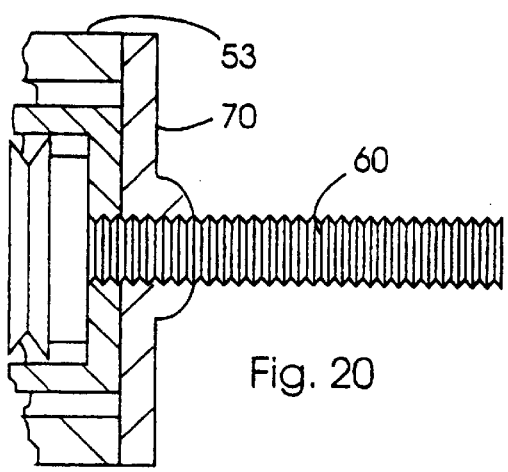
FIG. 20 is a cutaway view of part of the tool of FIG. 19 of the drawings.

A tool 50 for use with the device 100 is shown in FIG. 19 of the drawings. The tool 50 comprises a barrel 51 having a hand grip 52 attached thereto. The barrel 51 has a forwardly disposed end 53 and a rearwardly disposed end 54. Located inside the bore of the barrel 51 and free to move axially but not rotationally relative thereto is an externally threaded shaft 55. Fixed fast to the shaft 55 and at a location preferably nearer the rearwardly disposed end 54 is a sleeve 56. The length of the sleeve 56 determines the extent of the axial movement of the threaded shaft 55 relative to the barrel 51. A stop element 59, fixed fast to the shaft 55, engages with the barrel 51 and thus prevents rotation of the shaft 55 relative to the barrel 51. The stop element 59 is, however, free to move axially relative to the barrel 51. The distance between the stop members 57 and 59 together with the length of the sleeve 56 determines the range of the axial displacement of the shaft 55 relative to the barrel 51. At the rearwardly disposed end 54 there is provided an externally disposed stop member 57 which is fixed fast to the end 54 and through which the shaft 55 is free to move axially and rotationally relative thereto.

The shaft 55 is of a length such that it can project rearwardly of the barrel 51. Thus disposed on the shaft 55 and rearwardly of the stop member 57 is a nut 58.

The forwardly disposed end 53 has attached thereto a screw threaded member 60 which projects externally of the barrel 51 through an end element 61. The screw threaded member 60 is adapted to interengage with the thread 14 of the first component 10.

The length by which the member 60 projects from the barrel 51 is determined by the initial location of the nut 58 Thus rotation of the nut 58 in a first direction causes the shaft 55 to move axially rearwardly.

To complete the construction of the tool 50, there is provided a forming dome 70 as shown in FIGS. 15–18 of the drawings. The dome 70 has an obverse face 71 and a reverse face 72. The dome has a centrally disposed opening 73. The reverse face 72 has a centrally disposed rounded projection 74 which is of a shape and configuration to mate with the forwardly disposed end 36 of the second component 30.

The dome 70 is mounted on the tool 50 so that the member 60 passes therethrough and is free to move both axially and rotationally relative thereto.

Figure 23:
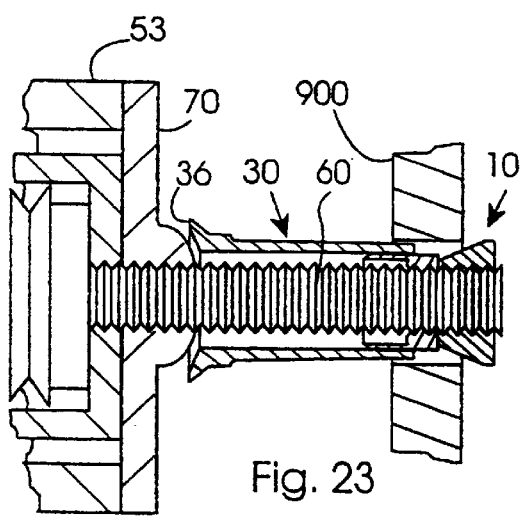
FIG. 23 shows the combination of FIG. 22 of the drawings with the first component in situ behind a substrate.
Figure 24:
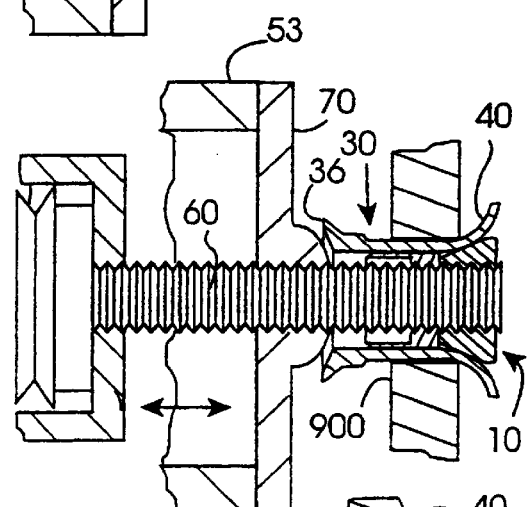
FIGS. 24–25 show stages of interengagement of the first and second components of the device according to the embodiment of the invention.
Figure 25:
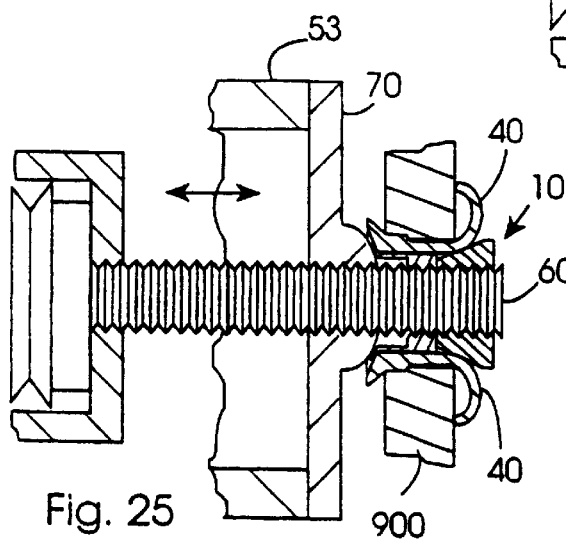

To use the mounting device 100 in a substrate 900 (FIG. 23) such as the frame of a $\mu$PVC or aluminium door or window of the type, a hole of suitable size is drilled in the substrate 900. The device 100 is mounted on the member 60 so that the screw threads of the member 60 are in interengagement with the threads 14 of the first component 10 and the free end of the member 60 projects slightly beyond the nut 13. The forwardly disposed end 36 of the second component 30 should now be mating with the dome 70. The nut 13 is inserted into the hole in the substrate 900 such that at least the nut 13 is inside the frame of the door or window of the substrate 900 and the remainder of the mounting device 100 projects from the hole in the substrate 900 (FIG. 23). It will be appreciated that, in the event that the cavity associated with the substrate 900 is sufficiently deep, all of the mounting device 100 other than the forwardly disposed end 36 can be accommodated therein.

Figure 26:
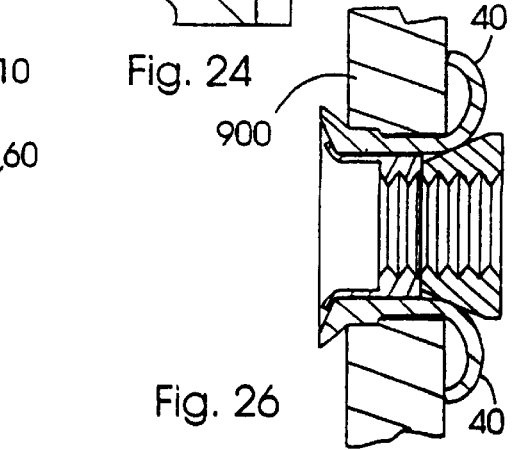
FIG. 26 shows the device according to the embodiment of the invention in situ.

The nut 58 is rotated so as to draw the shaft 55 and hence the member 60 into the barrel 51. This has the effect of forcing the second component 30 towards the nut 13 in the axial direction of the tube 32. As the nut 58 is rotated further, starting at the end 34 the relatively softer metal of the tube 32 is progressively split in the direction parallel to the tube axis by the arrisses 23–26, which act as cutting edges, to form a plurality of "petals" 40 which bear against the inclined facets 19–22 of the nut 13 and are thereby mutually splayed out radially with respect to the axis of the bore 11 and curve back upon themselves to bear against the inside surface of the substrate 900. The first component 10 and the second component 30 are forced together in this way until the nose 15 is compressed against the dome 70. The front end 18a of the nose 15 is thus distorted to become flared radially outwards into engagement with the flared front end of the collar 33 thereby mechanically locking the components 10 and 30 together. Thus, the first component 10 is prevented from inadvertently falling into the cavity. When the forwardly disposed end 36 abuts the substrate 900 and the nose 15 is in engagement with the forwardly disposed end 36, the shaft 55 is rotated relative to the nut 13 so as to release the tool 60 from the device 100. There is now provided as shown in FIG. 26, a firmly positioned mounting device 100.

The nut 13 is now available for accepting a screw (not shown) for enabling the mounting of a desired object to the substrate 900. The device 100 provides a fast, inexpensive and strong support for such an object.

The invention is not limited to the embodiments described herein which may be modified or varied without departing from the scope of the invention.

What is claimed is:

1. A mounting device including a first component and a second component, wherein the first component has a forwardly disposed nose, a rearwardly disposed and outwardly flared cutting member, and a bore extending through the nose and cutting member and which is threaded at least along part of its length, and wherein the second component, which is of a relatively softer material than the first component, comprises a tube for fitting over the nose of the first component, the arrangement being such that when the tube is fitted over the nose and forced in an axial direction against the cutting member the latter progressively splits the tube substantially parallel to its axis into a plurality of elements and splays such elements mutually radially outwardly with respect to the axis of the bore and wherein the cutting member further causes the elements to curve back upon themselves.

2. A mounting device as claimed in claim 1, wherein the cutting member comprises a plurality of rearwardly and outwardly inclined external surfaces of which adjacent such surfaces meet at respective arrisses, the arrisses constituting cutting edges for dividing the tube as aforesaid.

3. A mounting device as claimed in claim 1, wherein the front end of the nose is deformable radially outwards to engage the front end of the second component.

4. A mounting device as claimed in claim 3, wherein the front end of the second component is flared and the front end of the nose may be deformed so as to flare outwardly against the flared front end of the second component.

5. A mounting device as claimed in claim 1, wherein the tube is an interference fit on the nose.

6. A mounting device as claimed in claim 1, wherein the bore is threaded at least within the cutting member.

7. A mounting device including a first component and a second component, wherein the first component has a forwardly disposed nose, a rearwardly disposed and outwardly flared cutting member, and a bore extending through the nose and cutting member and which is threaded at least along part of its length, and wherein the second component, which is of a relatively softer material than the first component, comprises a tube for fitting over the nose of the first component, the arrangement being such that when the tube is fitted over the nose and forced in an axial direction against the cutting member the latter progressively splits the tube substantially parallel to its axis into a plurality of elements and splays such elements mutually radially outwardly with respect to the axis of the bore.

8. A mounting device as claimed in claim 7, wherein the cutting member comprises a plurality of rearwardly and outwardly inclined external surfaces of which adjacent such surfaces meet at respective arrisses, the arrisses constituting cutting edges for dividing the tube as aforesaid.

9. A mounting device as claimed in claim 7, wherein the front end of the nose is deformable radially outwards to engage the front end of the second component.

10. A mounting device as claimed in claim 9, wherein the front end of the second component is flared and the front end of the nose may be deformed so as to flare outwardly against the flared front end of the second component.

11. A mounting device as claimed in claim 7, wherein the tube is an interference fit on the nose.

12. A mounting device as claimed in claim 7, wherein the bore is threaded at least within the cutting member.

13. A mounting device including a first component and a second component, wherein the first component has a forwardly disposed nose, a rearwardly disposed and outwardly flared cutting member, and a bore extending through the nose and cutting member and which is threaded at least along part of its length, and wherein the second component comprises a tube for fitting over the nose of the first component, the arrangement being such that when the tube is fitted over the nose and forced in an axial direction against the cutting member the latter progressively splits the tube substantially parallel to its axis into a plurality of elements and splays such elements mutually radially outwardly with respect to the axis of the bore, and wherein the cutting member comprises a plurality of rearwardly and outwardly inclined external surfaces of which adjacent such surfaces meet at respective arrisses, the arrisses constituting cutting edges for dividing the tube.

14. A mounting device as claimed in claim 13, wherein the cutting member further causes the elements to curve back upon themselves.

15. A mounting device as claimed in claim 13, wherein the second component is of a relatively softer material than the first component.

16. A mounting device as claimed in claim 13, wherein the front end of the nose is deformable radially outwards to engage the front end of the second component.

17. A mounting device as claimed in claim 16, wherein the front end of the second component is flared and the front end of the nose may be deformed so as to flare outwardly against the flared front end of the second component.

18. A mounting device as claimed in claim 13, wherein the tube is an interference fit on the nose.

* * * * *